United States Patent [19]

Hiraoka

[11] Patent Number: 5,173,566
[45] Date of Patent: Dec. 22, 1992

[54] APPARATUS FOR RAPID REFERENCE TO MUSICAL SCALES

[76] Inventor: Tadashi Hiraoka, 1-2-7-605, Tamagawadai, Setagaya-ku, Tokyo, Japan, 158

[21] Appl. No.: 631,057

[22] Filed: Dec. 19, 1990

[30] Foreign Application Priority Data

Dec. 27, 1989 [JP]  Japan ............................ 1-150430[U]

[51] Int. Cl.⁵ ............................................ G09B 15/02
[52] U.S. Cl. .................................... 84/474; 235/78 R
[58] Field of Search ................. 84/471 SR, 474, 475; 368/27

[56] References Cited

U.S. PATENT DOCUMENTS

| | | | |
|---|---|---|---|
| 3,318,085 | 5/1967 | Lee | 368/27 |
| 3,431,722 | 3/1969 | Mass | 235/61 R |
| 3,472,117 | 10/1969 | Iverson, Jr. et al. | 84/474 |
| 3,728,932 | 4/1973 | Leonard | 84/473 |
| 3,841,192 | 10/1974 | Leonard | 84/485 |
| 4,037,518 | 7/1977 | Lorenzen | 84/474 |
| 4,961,362 | 10/1990 | Gunn | 84/474 |

Primary Examiner—Michael L. Gellner
Assistant Examiner—Eddie C. Lee
Attorney, Agent, or Firm—Wenderoth, Lind & Ponack

[57] ABSTRACT

Disclosed are various embodiments of a musical reference apparatus for use by musicians to rapidly and easily transpose or modulate music. The invention is preferably formed of two or three disc-shaped members which are rotatable relative to one another about a single axis. These disc-shaped members have musical indicia marked on upper surfaces thereof near their peripheries. The outer of the disc-shaped members has symbols thereon which represent musical tones, as does the inner of the disc-shaped members. An intermediate member which has symbols representing musical indexes can also be provided. Alternatively, the inner member can have two sets of symbols marked thereof, one representing musical tones, and the other representing musical indexes. Any of the various embodiments of the musical reference apparatus can be mounted on a reference card or on a wristwatch type device.

8 Claims, 4 Drawing Sheets

FIG. 5A
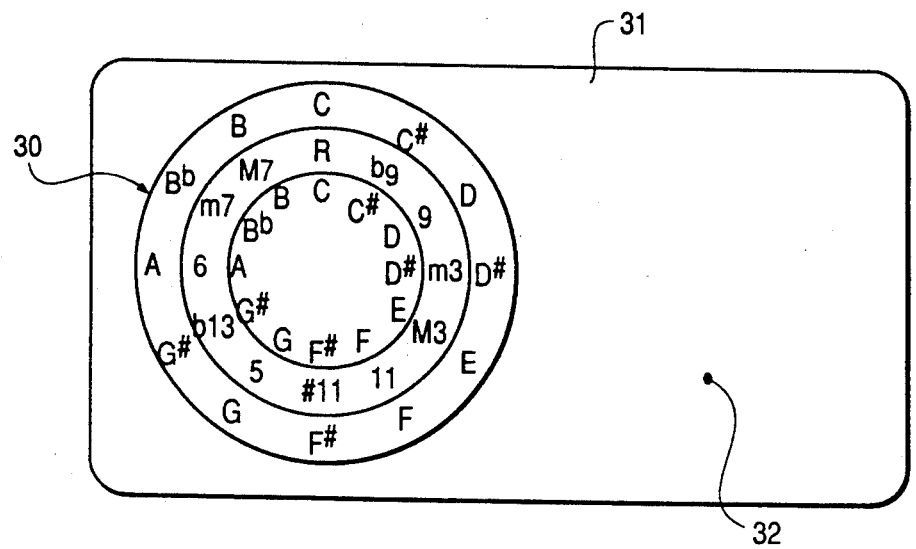
FIG. 5B
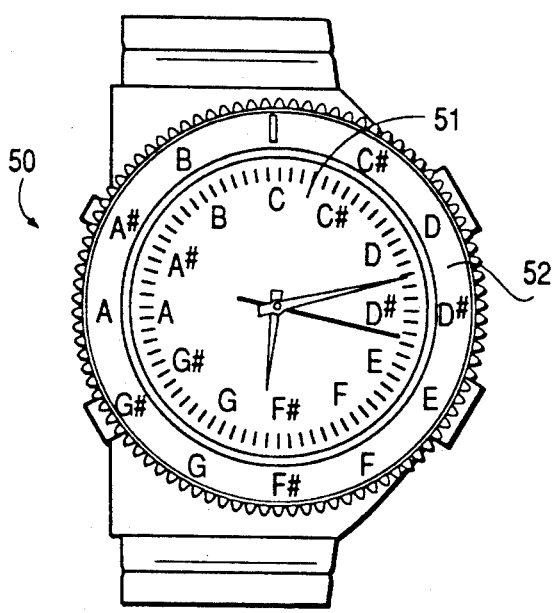
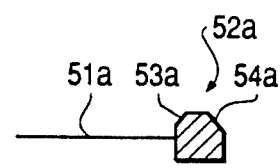
FIG. 6A
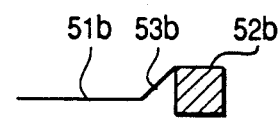
FIG. 6B
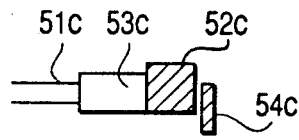
FIG. 6C

APPARATUS FOR RAPID REFERENCE TO MUSICAL SCALES

BACKGROUND OF THE INVENTION

1. Field of the Invention

This invention is directed to apparatus for rapidly referencing various musical tones when transposing or modulating music.

2. Description of the Prior Art

It is common for musicians to transpose or modulate music during performances. Transposition, for example, involves changing the root or keynote of a chord, scale or musical sequence, and correspondingly changing the remainder of the tones or notes in the chord, scale or musical sequence. Although experts can readily adapt their performance for such transposition, beginners, amateurs and musicians performing on musical instruments to which they are unaccustomed, generally incur difficulty in adapting to the changes.

For example, in traditionally western musical scales, major scales have intervals of whole-whole-half-whole-whole-whole-half tones, and upon change of the root or keynote, the positions of the tones and semitones tend to vary. Such variance makes it quite difficult for amateurs to perform properly (i.e. to transpose the music). Additionally, some musical instruments can be switched to transpose or modulate the music, but are often found to be less than perfect, thus resulting in tones which are out of tune or pitch.

SUMMARY OF THE INVENTION

Thus, an object of the present invention is to provide a novel apparatus to aid in the transposition or modulation of music by providing quick and easy reference to tones of a modulated or transposed scale, chord or musical sequence which properly correspond to the tones of the scale, chord or musical sequence prior to the modulation or transposition.

Accordingly, the present invention is embodied as an apparatus which comprises a first member having twelve spaced apart indicia thereon corresponding respectively to twelve musical sounds, and a second member having twelve spaced apart indicia thereon corresponding respectively to twelve musical sounds, wherein the second member is coaxially rotatably mounted relative to the first member such that the indicia on the second member can be aligned with the indicia on the first member in various positions corresponding to various relationships between the indicia on the first and second members. It is contemplated that the indicia on the first member be equally spaced apart, the indicia on the second member be equally spaced apart, and the angular spacing between the indicia on the first member be equal to the angular spacing of the indicia on the second member. Additionally, the first and second members are preferably circular in shape, with the second member being smaller in diameter than the first member and mounted on top of the first member for coaxial rotation relative thereto.

The present invention also contemplates a second embodiment, wherein an apparatus comprises a first member having twelve spaced apart indicia thereon corresponding respectively to twelve musical sounds, a second member having twelve spaced apart indicia thereon corresponding respectively to twelve musical sounds, and a third member having spaced apart indicia thereon corresponding respectively to a predetermined number of musical indexes. The first, second and third members are mounted for movement relative to one another such that the indicia on the first member, the second member and the third member can be aligned with each other in various positions corresponding to relationships between the indicia on the first, second and third members. It is further contemplated that the indicia on the first member be equally spaced apart, the indicia on the second member be equally spaced apart, and the indicia on the third member be equally spaced apart. Additionally, it is contemplated that the indicia on the first member be angularly spaced apart equally with respect to the indicia on the second and third members. Furthermore, the first, second and third members are preferably circular in shape and mounted together for coaxial rotation relative to one another. The third member is preferably smaller in diameter than the first member and mounted on top of the first member, and the second member is preferably smaller in diameter than the third member and mounted on top of the third member.

It is further contemplated that the members of either of the above-noted alternative arrangements can be mounted on a flat substrate so as to form a musical reference card. Alternatively, the members of either of the above-noted arrangements can be mounted on a wristband so as to form a wrist watch type musical reference apparatus.

With either of these arrangements, information can be rapidly obtained by reference to the reference apparatus in order to properly modulate or transpose a scale, chord or musical sequence.

BRIEF DESCRIPTION OF THE DRAWINGS

FIG. 5A is a plan view of the apparatus shown in FIG. 3A mounted on a musical reference card;

FIG. 5B illustrates the present invention embodied in the form of a wrist watch;

FIGS. 6A-6C are schematic illustrations of alternative structural details of the embodiments shown in FIGS. 5A-5C.

DETAILED DESCRIPTION OF THE INVENTION

Figure 1:
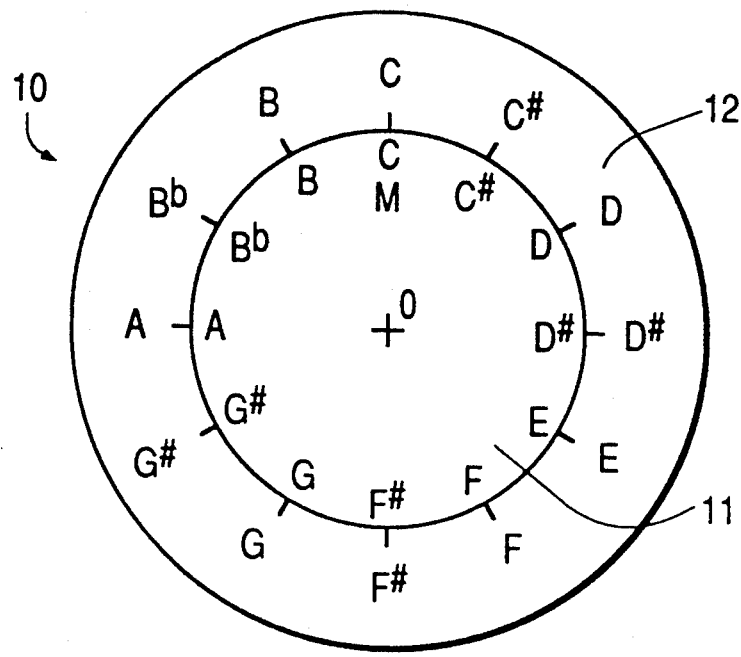
FIG. 1 is a plan view of a first embodiment of an apparatus according to the present invention.
Figure 2:
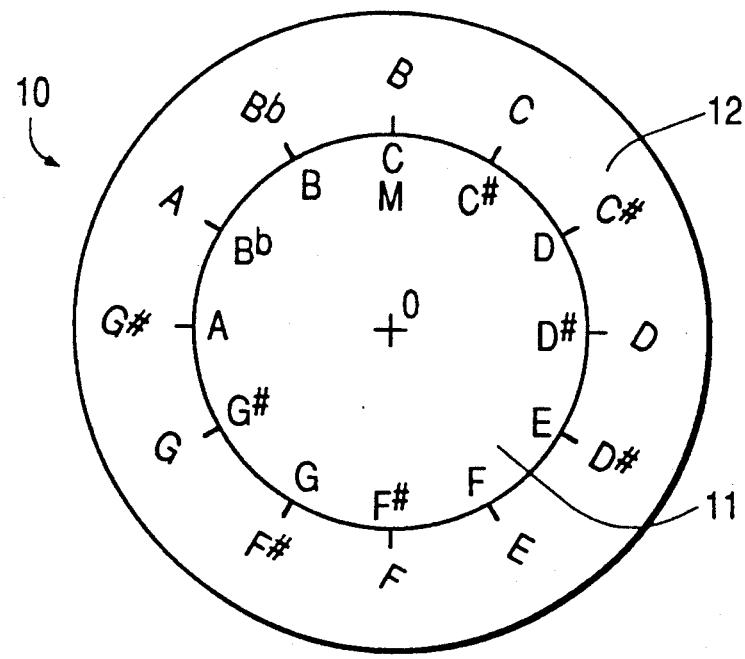
FIG. 2 is a plan view of the apparatus shown in FIG. 1, but shown in an operative position.

A first embodiment of a musical reference apparatus for use in transposing and modulating music, according to the present invention, is shown in FIGS. 1 and 2. In essential part the reference apparatus 10 comprises a first or outer member 12 which is preferably circular or disc-shaped, and a second or inner member 11 which is also preferably circular or disc-shaped. The disc-shaped members 11 and 12 are mounted one on the other such that they are rotatable with respect to one another about a common central axis O. It is contemplated that the inner member 11 will be smaller in diameter than the outer member 12 such that, when the inner member 11 is mounted atop the outer member 12, indicia on the upper surface of the outer member 12 near the outer periphery thereof are visible and are positioned outwardly of the inner member 11. Although the inner member 11 can be mounted to the outer member 12 in any suitable manner wherein the two disc-shaped members 11, 12 are coaxially rotatable relative to one another about the axis 0, the inner member 11 is preferably mounted in "snapped" relation with the outer member 12, such that the two members are mounted in coaxially rotatable relation. As will be discussed later, the two disc-shaped members 11, 12 may be mounted on various types of bases. When the two members 11, 12 are so mounted on a base, it is preferred that the outer member 12 be mounted immovably to the base, with the inner member 11 being rotatably mounted on the outer member 12.

As previously mentioned, and as shown in FIGS. 1 and 2, indicia are provided on the upper surface of the outer member 12 near an outer periphery thereof, such that the indicia are visible outwardly of the inner member 11. These indicia are defined by twelve symbols which correspond to twelve musical sounds. For example, the symbols can be represented in chromatic form as C, C# (D$^b$), D, D# (E$^b$), E, F, F# (G$^b$), G, G# (A$^b$), A, B$^b$(A#) and B. These symbols are preferably equally spaced about the periphery of the outer member 12. With the use of twelve indicia on a circular disc-shaped member such as outer member 12, this corresponds to an angular spacing of 30° between each symbol. In a similar manner, indicia are provided on the inner member 11 and are preferably substantially identical to the indicia on the outer member 12. Like the symbols on the outer member 12, the symbols on the inner member 11 are equally spaced about the periphery of the inner member 11, such that they are equally spaced apart at 30° intervals. In this manner, as the angular spacing between the symbols on the inner member 11 and the outer member 12 is equal, the symbols on the inner member 11 can be aligned with the symbols on the outer member 12 in various rotational positions of the inner member 11 with respect to the outer member 12.

Of course, as will be readily understood by persons of ordinary skill in the art, the symbols shown in FIG. 1 are merely representations of specific musical notes and can be equally represented by symbols different than those shown in the draw-ing figures. For example, in a major tune having its root or keynote represented by C, a Japanese scale may be represented by the sequence "DO", "RE", "MI", "FA", "SO", "LA", "TI", and "DO". These musical representations correspond to the designations C, D, E, F, G, A, B and C, respectively. As an example of the operation of the musical reference apparatus 10 according to the embodiment of FIG. 1, FIG. 2 shows one use of the musical reference apparatus 10 in transposing or modulating a scale, chord or musical sequence. More specifically, FIG. 2 shows the musical reference apparatus having the inner member 11 rotated relative to the outer member 12 by 30° from the position shown in FIG. 1. In this position, the apparatus 10 is useful in transposing or modulating a scale, chord or musical sequence in which the root or keynote of C is to be changed to a root or keynote of B. Thus, the symbol C of the inner member 11 is aligned with the symbol B of the outer member 12. With the apparatus 10 positioned in this manner, a musician desiring to transpose or modulate a scale, chord or musical sequence from one with a root or keynote of C to one having a root or keynote of B can quickly and easily refer to the apparatus 10 to determine the properly corresponding musical note (as read from the outer member 12) to be substituted for the original musical note (as read from the inner member 11). Properly corresponding notes of this example are shown in table 1 below.

TABLE 1

| keynote | 2 | 3 | 4 | 5 | 6 | 7 | 8 |
|---------|---|---|---|---|---|---|---|
| C | D | E | F | G | A | B | C |
| B | C# | D# | E | F# | G# | B$^b$ | B |
|   | (D$^b$) | (E$^b$) |   | (G$^b$) | (A$^b$) | (A#) |   |

Thus, it is apparent that the present invention provides rapid and easy reference for transposing or modulating a musical scale, chord or musical sequence. As shown in FIG. 1, a marking M can be provided at the position of the C symbol on the inner member 11 so as to facilitate the setting of the musical reference apparatus 10.

Figure 3A:
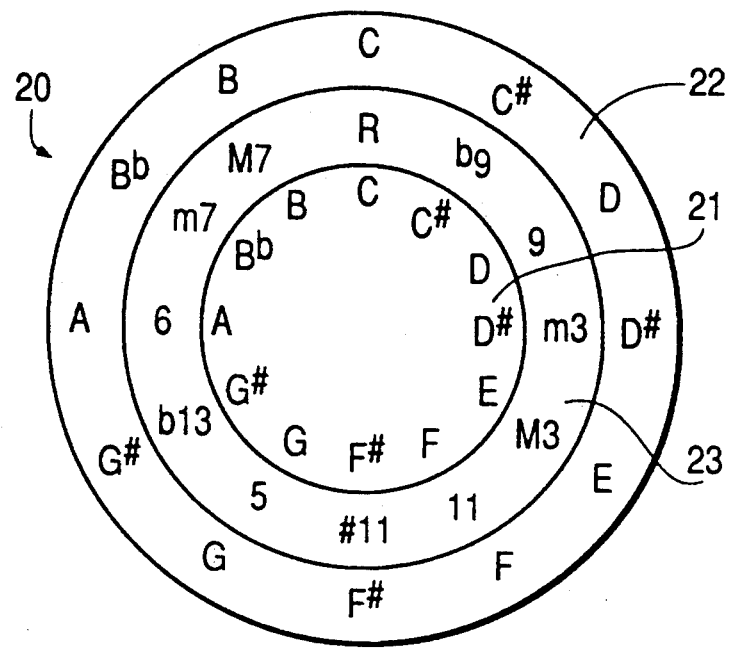
FIG. 3A is a plan view of a second embodiment of the apparatus according to the present invention.

FIG. 3A shows a second embodiment of the musical reference apparatus of the present invention. In this embodiment, a musical reference apparatus 20 comprises a first or outer member 22, a second or inner member 21, and a third or intermediate member 23. Each of these members is preferably circular or disc-shaped with the inner member 21 being smaller in diameter than the intermediate member 23, and the intermediate member 23 being smaller in diameter than the outer member 22.

Figure 3B:
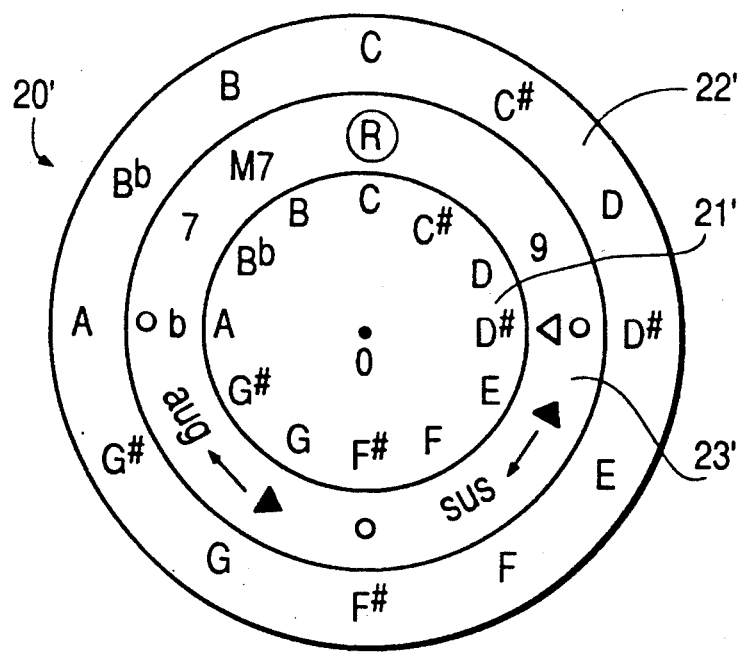
FIG. 3B is a plan view of the embodiment of FIG. 3A, but with alternative indicia thereon.

The outer and inner members of this embodiment are similar to the outer and inner members, respectively, of the first embodiment shown in FIGS. 1 and 2. That is, the outer member has a predetermined number of spaced apart indicia on an upper surface about its periphery which correspond to a predetermined a number of musical sounds, and the inner member also has a predetermined number of spaced apart indicia on an upper surface thereof about its periphery which correspond respectively to a predetermine number of musical sounds. For example, and like the first embodiment shown in FIGS. 1 and 2, there are twelve indicia on each of the inner 21 and outer 22 members. More specifically, each of the inner 21 and outer 22 members may have musical indicia corresponding to the musical notes C, C#, D, D#, E, F, F#, G, G#, A, B$^b$, and B. The intermediate member 23 also has a predetermined number of spaced apart indicia on an upper surface thereof about its periphery which correspond to a predetermined number of musical indexes. The indicia on the intermediate member 23 may, for example correspond to the musical indexes of "Root", "Minor Second", "Major Second", "Minor Third", "Major Third", "Perfect Fourth", "Augmented Fourth" (Diminished Fifth), "Perfect Fifth", "Augmented Fifth" (Diminished Sixth), "Major Sixth", "Minor Seventh", and "Major Seventh". These indexes are respectively denoted as shown in FIG. 3 with "Root" being denoted by R, and the remaining indexes just mentioned being denoted successively by the symbols about the intermediate disc 23 as read clockwise from R. FIG. 3B shows a musical reference apparatus 20' identical to that shown in FIG. 3A except that its intermediate member 23' has indicia thereon denoting musical indexes by way of symbols which differ from those in FIG. 3A. The indicia on the intermediate disc 23' include only symbols of selected ones of the musical indexes previously mentioned in connection with FIG. 3A. Again it is noted that the indicia shown in the drawing figures are merely examples and can be replaced with any indicia which suitably represents musical tones or indexes.

The inner member 21 and outer member 22 of the embodiment shown in FIGS. 3A and 3B, can be aligned with one another in various positions in the same manner as described above for the inner member 11 and outer member 12 of the embodiment shown in FIGS. 1 and 2. However, the additional provision of the intermediate member 23 allows the musician to utilize the musical reference apparatus for additional purposes. That is, the musical reference apparatus can be used by a musician to determine the notes in a chord. Table 2 (below) shows the various symbols of the intermediate member 23 (and 23') which are to be used as reference points for specific cords. The symbol on the outer member 22 which corresponds to the root or keynote of a chord is aligned with the symbol R on the intermediate member 23, and then the symbols (representing notes) on the outer member 22 which are aligned with the proper symbols (as determined from table 2) on the intermediate member 23 are read off of the outer member 22 and indicate the notes of the desired chord.

member 22 which aligns with the symbol M3 on the intermediate member 23 is to be played as a sharp in the augment chord.

Table 2 discussed above shows the tonal intervals (intervals between various tones) of a chord. Reference to this table can be had by musicians lacking knowledge of the various tonal intervals for each chord.

As previously mentioned in connection with the inner and outer members, the symbols on the intermediate member 23 can be varied in accordance with various musical notations. For example, the Japanese major chord "DO", "MI", and "SO" can be positioned at R, M3, and 5. Then, of course, when the root or keynote is C, these positions align with the notes C, E and G on the outer member 22.

Figure 4:
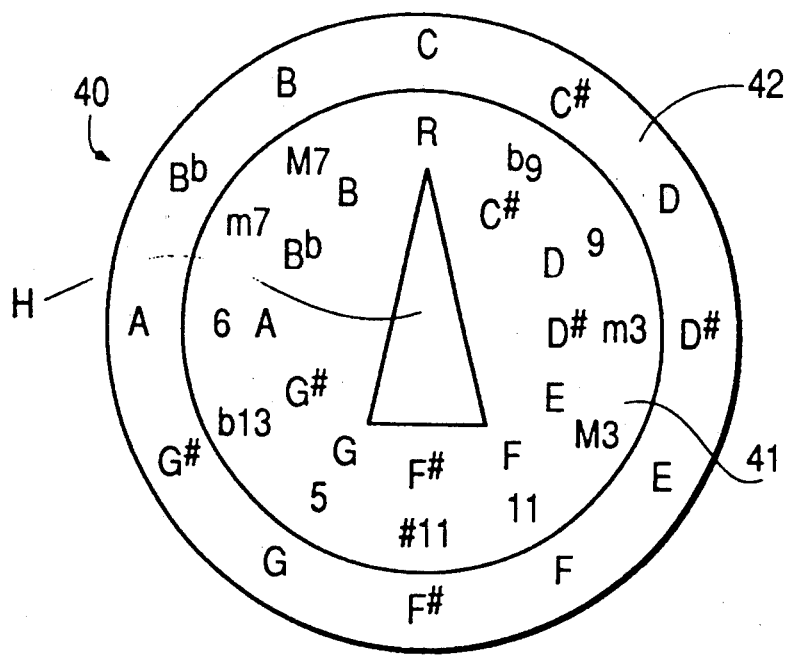
FIG. 4 is a plan view of a third embodiment of the present invention.

FIG. 4 shows a third embodiment of the invention wherein a musical reference apparatus 40 is modified relative to the musical reference apparatus 20 (as shown in FIG. 3A) in that the musical reference apparatus 40 of FIG. 4 includes only an inner member 41 and an outer member 42. However, unlike the first embodiment (shown in FIG. 1), the inner member 41 of this embodiment has indicia thereon corresponding to the indicia on both of the inner member 21 and intermediate member 23 of the musical reference apparatus 20 of FIG. 3A. The musical reference apparatus 40 of this

TABLE 2

| chronic No. | 12 | 1 | 2 | 3 | 4 | 5 | 6 | 7 | 8 | 9 | 10 | 11 |
|---|---|---|---|---|---|---|---|---|---|---|---|---|
| interval | R1 | m2 | M2 | m3 | M3 | P4 | aug4 | P5 | aug5 | M6 | m7 | M7 |
| indication | R | b9 | 9 | m3 | M3 | 11 | #11 | 5 | b13 | 6 | m7 | M7 |
| tension | oct | b9 | η9 | #9 | | η11 | #11 | | b13 | η13 | | |
| ■ major | ● | | ▲ | | ● | | ▲ | ● | | ○ | | ○ |
| tension | | | | | | | | | | ▲ | | |
| ■ minor | ● | | ▲ | ● | | ▲ | | ● | | ○ | | ○ |
| tension | | | | | ▲ | | | | | ▲ | | |
| ■ dominant 7th | ● | | ▲ | ▲ | ● | | ▲ | ● | ▲ | ▲ | ● | |
| tension | | ▲ | | | | | | | | | | |
| ■ minor 7th | ● | | ▲ | ● | | ▲ | | ● | | ▲ | ● | |
| tension | | | | | | | | | | | | |
| ■ diminish | ● | | ▲ | ● | | ▲ | ● | | ● | | | ▲ |
| tension | | | | | | | | | ▲ | | | |
| ■ augment | ● | | ▲ | | ● | | ▲ | | ● | | ○ | ○ |
| tension | | * | | * | | | | | | | | |
| ■ sus 4 | ● | | | | | ● | | ● | | | ● | |
| tension | | ▲ | ▲ | ▲ | | | | | ▲ | ▲ | | |

■ : chords, useful as they are or combinable with tensions
● fundamentals
○ additions
▲ : variations
*useful only when fourth tone is m7
tones below 7th: useful as they are
tones above 7th: additive to seventh tone
chromatic tones: not useful simultaneously except for an interval beyond octave For example, if the chord whose notes are to be determined is A Minor Seventh (Am7), the root or keynote A of the chord (denoted by the symbol A on the outer member 22) is aligned with the "Root" symbol R on the intermediate member 23. Then, the symbols on the outer member 22 which align with the symbols R, m3, 5, and m7 on the intermediate member 23 indicate the notes of the chord A Minor Seventh. Additionally, the symbols on the outer member 22 which align with the symbols 9, 11, and 6 (see Table 2 at the line labelled "tension" beneath the label "Minor Seventh") indicate notes one octave above the notes of the chord, which are often used as tension notes.

The symbol "sus" on the outer member 22 indicates that the note denoted by the symbol on the outer member 22 which aligns with the symbol M3 on the intermediate member 23 is to be played as a sharp in the Suspended Four chord. Similarly, the symbol "aug" on the outer member 22 indicates that the symbol on the outer embodiment can be utilized for the same functions as discussed above in connection with the musical reference apparatus 20 of the second embodiment.

The musical reference apparatus 40 of this embodiment also preferably includes a triangular shaped "hand" H, as shown in FIG. 4. The musical reference apparatus 40 of this embodiment can be used for tonal settings during transposition or modulation, between and among musical instruments of different pitches. That is, the tonal setting of a first pitch can be indicated by the symbols on the outer ring 42, while the tonal setting of a second pitch can be denoted by the symbols on the inner ring 41. For example, to transpose or modulate a musical sequence in a key of C to a musical sequence in the key of F, the symbol C on the inner member 41 should be aligned with the symbol F on the outer member 42. The symbols on the inner member 41 corresponding to tones in the musical sequence set in the key of C are then aligned properly with the symbols on the outer member 42. The symbols on the outer member 42 which align with those symbols on the inner member 41 represent the tones of the musical sequence or chord transposed into the key of F. In a similar manner, music for an instrument which is set in one key can be transposed or modulated to music for a second instrument set in a different key. For example, in order to transpose music for a piano (key of C) to music for a trumpet (key of B$^b$), C on the inner member 41 should be aligned with B$^b$ (A$^\#$) on the outer member 42. With this alignment, the piano music is represented by the symbols of the inner member 41, while the corresponding trumpet music is represented by the symbols on the outer member 42.

In order to determine major chord settings with the embodiment shown in FIG. 4, the root symbol R on the inner member 41 is aligned with the symbol on the outer member 42 which represent the desired keynote. The three major cords of such keynote can then be determined by reading the symbols on the outer member 42 which align with the three corners of the triangular hand H. For example, the three major cords (C, F, and G7) of the keynote C can be determined by aligning the root symbol R on the inner member 41 with the symbol C on the outer member, and reading the symbols on the outer member which align with the three corners of the triangular hand H. Similarly, the three major cords of the key tone A Minor (Am, Dm, and E7) can be determined by aligning the root symbol R on the inner member 41 with the symbol A on the outer member 42, and then reading the symbols from the outer member which are aligned with the corners of the triangular hand H.

FIG. 5A shows a musical reference apparatus 30, identical to the musical reference apparatus 20 shown in FIG. 3A, mounted on a flat substrate or reference card 31. As shown in FIG. 4, the musical reference apparatus 30 is preferably mounted to one side of the card 31, so that a region 32 of the card 31 remains available for other purposes, such as for the mounting of a sticker describing how to use the musical reference apparatus 30, for the mounting of an electronic calculator, or for placing advertising or other product information. The mounting of the musical reference apparatus 30 on the reference card 31 provides for convenience in handling of the device.

FIG. 5B shows a musical reference apparatus 50 similar to the musical reference apparatus 10 (FIG. 1) mounted on a wrist band in the form of a wristwatch. In fact, the musical reference apparatus of FIG. 5B is incorporated into a wristwatch by having the indicia of the inner member marked on the face 51 of the watch, and the indicia of the outer member marked on the bezel ring 52 of the watch, wherein the bezel ring can be rotated relative to the face of the watch.

Figure 5C:
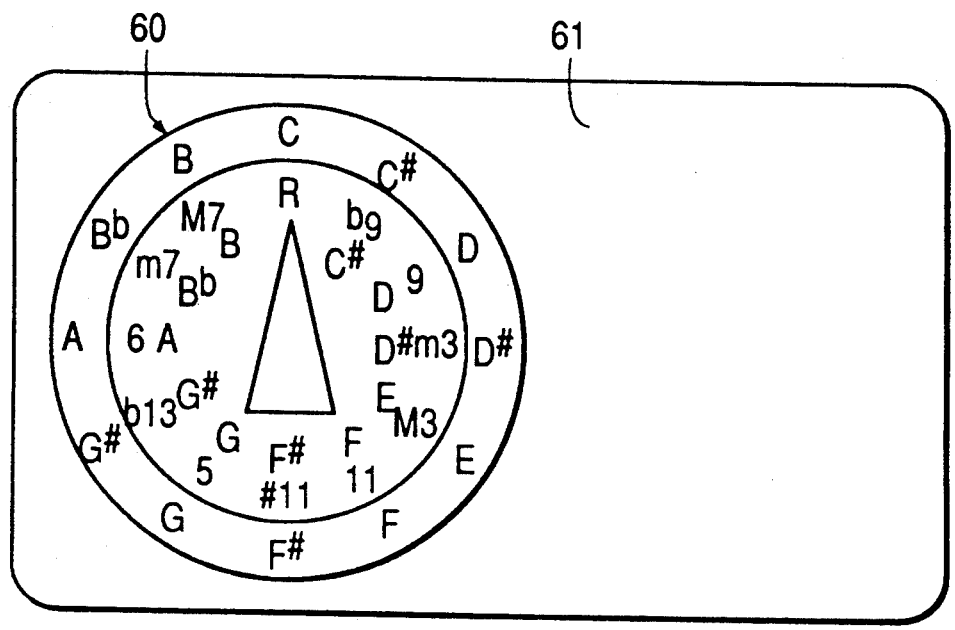
FIG. 5C illustrates a musical reference card similar to that shown in FIG. 5A, but with the apparatus shown in FIG. 4 mounted thereon.

FIG. 5C shows a musical reference apparatus identical to the musical reference apparatus 40 of the third embodiment (FIG. 4) mounted on a reference card 61. It is contemplated than any of the modified versions of the musical reference apparatus of the present invention can be mounted on such a reference card.

FIGS. 6A–6C show three structural variations of the musical reference apparatus 50 shown in FIG. 5B. More specifically, the structure schematically shown in FIG. 6A includes a flat inner member 51a, and a rotatable outer member 52a which is rotatable relative to the inner member 51a. The rotatable outer member 52a has an upwardly and inwardly facing sloped portion 53a and an outwardly and upwardly facing sloped portion 54a. In this variation, it is preferable that a first set of symbols be marked on the inner member 51a, a second set of symbols be marked on the sloped portion 53a of the outer member 52a, and that a third set of symbols be marked on the sloped portion 54a of the outer member 52a.

The structure shown schematically in FIG. 6B includes an inner member which has a flat portion 51b which preferably has a first set of symbols marked thereon, and a sloping portion 53b which preferably has a second set of symbols marked thereon. The structure of FIG. 6B further includes a rotatable outer member 52B which preferably has a third set of symbols marked thereon.

A third structural variation is shown schematically in FIG. 6C. This structure includes an inner member 51c which has a set of symbols marked thereon, an outer member 52c which has another set of symbols marked thereon, and an intermediate member 53c which has a third set of symbols marked thereon. These three members are rotatable relative to one another, and a stem 54c is provided to aid in rotation of the different members.

Although specific embodiments have been described, the scope of the invention is not to be limited by such description, but is rather only to be limited in accordance with the appended claims.

I claim:

1. An apparatus for use in modulating and transposing music, comprising:
   a first member having a predetermined number of spaced apart indicia thereon corresponding respectively to a predetermined number of musical sounds;
   a second member having a predetermined number of spaced apart indicia thereon corresponding respectively to a predetermined number of muscial sounds;
   a third member having a predetermined number of spaced apart indicia thereon corresponding respectively to a predetermined number of musical indexes; and
   a means for mounting said first, second and third members for movement relative to one another such that said predetermined number of spaced apart indicia on said first member, said predetermined number of spaced apart indicia on said second member and said predetermined number of spaced apart indicia on said third member can be aligned with each other in various positions corresponding to various relationships between said predetermined number of spaced apart indicia on said first member, said predetermined number of spaced apart indicia on said second member and said predetermined number of spaced apart indicia on said third member;
   wherein said predetermined number of spaced apart indicia on said first member correspond to the musical notes C, C$^\#$, D, D$^\#$, E, F, F$^\#$, G, G$^\#$, A, B$^b$, and B;
   wherein said predetermined number of spaced apart indicia on said second member correspond to the musical notes C, C$^\#$, D, D$^\#$, E, F, F$^\#$, G, G$^\#$, A, B$^b$, and B;
   wherein said predetermined number of spaced apart indicia on said third member correspond to the musical indexes of root, minor second, major second, minor third, major third, perfect fourth, augmented fourth, perfect fifth, augmented fifth, major sicth, minor seventh, and major seventh, respectively; and wherein said first member is circular in shape, said second member is circular in shape, said third member is circular in shape, and said mounting means comprises means for mounting said first, second and third members for coaxial rotation relative to one another, said third member being smaller in diameter than said first member and mounted on top of said first member, and said second member being smaller in diameter than said third member and mounted on top of said third member.

2. An apparatus as recited in claim 1, wherein said indicia on said first member are substantially equally spaced apart;

said indicia on said second member are substantially equally spaced apart; and said indicia on said first member are angularly spaced apart by an amount equal to angular spacing of said indicia on said second member.

3. An apparatus as recited in claim 1, further comprising a flat substrate; and wherein said first, second, and third members are mounted on said flat substrate.

4. The apparatus of claim 3, wherein said flat substrate is substantially larger in area than said first, second and third members, said members being mounted toward one side of said flat substrate so as to provide a large vacant area on said flat substrate adjacent to said first, second and third members.

5. An apparatus for use in modulating and transposing music, comprising:

a wristwatch having a wristband;

a first circular member having twelve indicia thereon corresponding respectively to twelve musical sounds, in chromatic form, equally spaced apart about said first circular member;

a second circular member having a smaller diameter than said first circular member and having twelve indicia thereon corresponding respectively to twelve musical sounds, in chromatic form, equally spaced apart about the periphery of said second circular member;

said wristwatch further comprising means for mounting said second member for movement relative to said first member such that said predetermined number of spaced apart indicia on said second member can be aligned with said predetermined number of spaced apart indicia on said first member in various positions corresponding to various relationships between said predetermined number of spaced apart indicia on said second member and said predetermined number of spaced apart indicia on said first member, wherein said first circular member is a bezel ring of said wristwatch and said second circular member forms a face of said wristwatch, said bezel ring being rotatable relative to said face; and wherein said second circular member is flat and said first circular member formign said bezel ring has an upwardly and inwardly facing sloped portion and an upwardly and outwardly facing sloped portion thereon, said first circular member further having a second set of twelve indicia thereon, the first set of said twelve indicia and said second set being positioned on said inwardly and outwardly facing sloped portions.

6. The apparatus of claim 5, wherein said wristwatch includes at least one indicator for indicating time, said second circular member forming said face having said twelve indicia positioned thereon at points normally occupied by the hour numerals of the twelve hour time period of an analog wristwatch.

7. An apparatus for use in modulating and transposing music, comprising:

a wristwatch having a wristband;

a first circular member having twelve indicia thereon corresponding respectively to twelve musical sounds, in chromatic form, equally spaced apart about said first circular member;

a second circular member having a smaller diameter than said first circular member and having twelve indicia thereon corresponding respectively to twelve musical sounds, in chromatic form, equally spaced apart about the periphery of said second circular member;

said wristwatch further comprising means for mounting said second member for movement relative to said first member such that said predetermined number of spaced apart indicia on said second member can be aligned with said predetermined number of spaced apart indicia on said first member in various positions corresponding to various relationships between said predetermined number of spaced apart indicia on said second member and said predetermined number of spaced apart indicia on said first member, wherein said first circular member is a bezel ring of said wristwatch and said second circular member forms a face of said wristwatch, said bezel ring being rotatable relative to said face; and wherein said second circular member has a flat portion with said twelve indicia thereon and a sloping portion having an additional set of twelve indicia thereon.

8. The apparatus of claim 7, wherein said wristwatch includes at least one indicator for indicating time, said second circular member forming said face having said twelve indicia positioned thereon at points normally occupied by the hour numerals of the twelve hour time period of an analog wristwatch.

* * * * *